United States Patent
Bhattacharya et al.

(10) Patent No.: US 9,471,876 B2
(45) Date of Patent: Oct. 18, 2016

(54) METHODS AND SYSTEMS FOR DETERMINING INTER-DEPENDENICES BETWEEN APPLICATIONS AND COMPUTING INFRASTRUCTURES

(71) Applicant: Xerox Corporation, Norwalk, CT (US)

(72) Inventors: Sakyajit Bhattacharya, Bangalore (IN); Tridib Mukherjee, Bangalore (IN); Koustuv Dasgupta, Bangalore (IN); Shruti Kunde, Mumbai (IN)

(73) Assignee: Xerox Corporation, Norwalk, CT (US)

( * ) Notice: Subject to any disclaimer, the term of this patent is extended or adjusted under 35 U.S.C. 154(b) by 312 days.

(21) Appl. No.: 14/273,566

(22) Filed: May 9, 2014

(65) Prior Publication Data
US 2015/0324695 A1    Nov. 12, 2015

(51) Int. Cl.
*G06F 17/00* (2006.01)
*G06N 5/02* (2006.01)
*G06N 5/04* (2006.01)
*H04L 29/08* (2006.01)
*G06N 99/00* (2010.01)

(52) U.S. Cl.
CPC .............. *G06N 5/04* (2013.01); *G06N 99/005* (2013.01); *H04L 67/10* (2013.01)

(58) Field of Classification Search
USPC ........................................................ 706/46
See application file for complete search history.

(56) References Cited

U.S. PATENT DOCUMENTS

| | | | |
|---|---|---|---|
| 9,124,498 B2 * | 9/2015 | Jung | H04L 43/0876 |
| 9,152,919 B2 * | 10/2015 | Dasgupta | G06N 5/02 |
| 9,165,080 B2 * | 10/2015 | Acharya | G06F 17/30873 |
| 9,178,952 B2 * | 11/2015 | Acharya | H04L 41/12 |
| 9,201,875 B2 * | 12/2015 | Kandasamy | G06F 17/30 |
| 9,218,343 B2 * | 12/2015 | Kandasamy | G06F 17/30 |
| 9,228,841 B2 * | 1/2016 | Dutta | G01C 21/3605 |
| 9,262,502 B2 * | 2/2016 | Kunde | G06F 17/30589 |
| 9,269,259 B2 * | 2/2016 | Mondal | H04L 67/04 |
| 9,342,129 B2 * | 5/2016 | Mukherjee | G06F 1/3203 |
| 9,378,511 B2 * | 6/2016 | Chafle | G06Q 10/06 |
| 9,383,976 B1 * | 7/2016 | Singh | G06F 8/34 |
| 9,391,917 B2 * | 7/2016 | Mukherjee | H04L 47/70 |

(Continued)

OTHER PUBLICATIONS

MR-MNBC: MaxRel based feature selection for the multi-relational Naïve Bayesian Classifier Vimalkumar B. Vaghela; Kalpesh H. Vandra; Nilesh K. Modi 2013 Nirma University International Conference on Engineering (NUiCONE) Year: 2013 pp. 1-9, DOI: 10.1109/NUiCONE.2013.6780067 IEEE Conference Publications.*

(Continued)

*Primary Examiner* — Michael B Holmes

(57) ABSTRACT

Methods and systems for creating one or more statistical classifiers. A first set of performance parameters, corresponding to the one or more applications and the one or more computing infrastructures, is extracted from a historical data pertaining to the execution of the one or more applications on the one or more computing infrastructures. Further, a set of application-specific and a set of infrastructure-specific parameters are selected, from the first set of performance parameters, based on one or more statistical techniques. A similarity between each pair of the applications, each pair of the computing infrastructures, and each pair of possible combinations of an application and a computing infrastructure is determined. One or more statistical classifiers are created, based on the determined similarity.

13 Claims, 5 Drawing Sheets

(56) References Cited

U.S. PATENT DOCUMENTS

2005/0066044 A1* 3/2005 Chaskar ............... G01S 5/0205
709/230
2005/0097120 A1* 5/2005 Cooper ............ G06F 17/30265

OTHER PUBLICATIONS

Age group classification via structured fusion of uncertainty-driven shape features and selected surface features Kuan-Hsien Liu; Shuicheng Yan; C. -C. Jay Kuo IEEE Winter Conference on Applications of Computer Vision Year: 2014 pp. 445-452, DOI: 10.1109/WACV.2014.6836068 IEEE Conference Publications.*
An adaptive classifier design for high-dimensional data analysis with a limited training data set Q. Jackson; D. A. Landgrebe IEEE Transactions on Geoscience and Remote Sensing Year: 2001, vol. 39, Issue: 12 pp. 2664-2679, DOI: 10.1109/36.975001 IEEE Journals & Magazines.*
Conditional Random Fields for Integrating Local Discriminative Classifiers Jeremy Morris; Eric Fosler-Lussier IEEE Transactions on Audio, Speech, and Language Processing Year: 2008, vol. 16, Issue: 3 pp. 617-628, DOI: 10.1109/TASL.2008.916057 IEEE Journals & Magazines.*
Gupta, S.; Fritz, C.; deKleer, J.; and Witteveen, C Diagnosing Heterogeneous Hadoop Clusters. In Proceedings of the 23rd International Workshop on Principles of Diagnosis (DX), 2012.
Wilcoxon, Frank. Individual Comparisons by Ranking Methods. Biometrics Bulletin, Dec. 1945, vol. 1, Issue 6, pp. 80-83.
Cortes, Corinna and Vapnik, Vladimir. Support-Vector Networks. Machine Learning, Sep. 1995, vol. 20, Issue 3, pp. 273-297.

* cited by examiner

METHODS AND SYSTEMS FOR DETERMINING INTER-DEPENDENICES BETWEEN APPLICATIONS AND COMPUTING INFRASTRUCTURES

TECHNICAL FIELD

The presently disclosed embodiments are related, in general, to computing infrastructures. More particularly, the presently disclosed embodiments are related to methods and systems for determining inter-dependencies between applications and computing infrastructures.

BACKGROUND

Computing infrastructure may refer to a network of computing devices, interconnected over a communication network. For example, the computing infrastructure may refer to a cloud network including a datacenter. Further, the datacenter may include one or more physical servers, from which the computational resources (e.g., in the form of virtual machines (VMs)) can be allocated to users. The users may utilize the allocated computational resources to execute one or more applications. Examples of computational resources may include, but are not limited to, CPU, random access memory (RAM), storage space, software, and so forth.

Prediction of performance of the applications, transmitted by the users, on the computing infrastructures has been of paramount importance to the computing infrastructure service providers with respect to resource management and proper recommendation of computational resources to the users. Traditionally, the prediction of the performance of the applications on specific computing infrastructures has been done by modeling the applications and the infrastructures without considering the intricate dependencies between the applications and the infrastructures. Rather, specific computing infrastructures are usually characterized for specific applications.

SUMMARY

According to embodiments illustrated herein, there is provided a method for creating one or more statistical classifiers for recommending one or more applications and one or more computing infrastructures for executing the one or more applications. The method includes extracting a first set of performance parameters corresponding to the one or more applications and the one or more computing infrastructures from a historical data pertaining to the execution of the one or more applications on the one or more computing infrastructures. The method further includes selecting a set of application-specific parameters corresponding to the one or more applications and a set of infrastructure-specific parameters corresponding to the one or more computing infrastructures, from the first set of performance parameters, based on one or more statistical techniques. The method further includes determining a similarity between each pair of applications from the one or more applications based on the set of application-specific parameters, a similarity between each pair of computing infrastructures from the one or more computing infrastructures based on the set of infrastructure-specific parameters, and a similarity between each combination of an application from the one or more applications and a computing infrastructure from the one or more computing infrastructures, based on the set of application-specific parameters and the set of infrastructure-specific parameters. The method further includes creating the one or more statistical classifiers, based on the determined similarity. The method is performed by one or more processors.

According to embodiments illustrated herein, there is provided a system for creating one or more statistical classifiers for recommending one or more applications and one or more computing infrastructures for executing the one or more applications. The system includes one or more processors operable to extract a first set of performance parameters corresponding to the one or more applications and the one or more computing infrastructures from a historical data pertaining to the execution of the one or more applications on the one or more computing infrastructures. The one or more processors are further operable to select a set of application-specific parameters corresponding to the one or more applications and a set of infrastructure-specific parameters corresponding to the one or more computing infrastructures, from the first set of performance parameters, based on one or more statistical techniques. The one or more processors are further operable to determine a similarity between each pair of applications from the one or more applications based on the set of application-specific parameters, a similarity between each pair of computing infrastructures from the one or more computing infrastructures based on the set of infrastructure-specific parameters, and a similarity between each combination of an application from the one or more applications and a computing infrastructure from the one or more computing infrastructures, based on the set of application-specific parameters and the set of infrastructure-specific parameters. The one or more processors are further operable to create the one or more statistical classifiers, based on the determined similarity.

According to embodiments illustrated herein, there is provided a computer program product for use with a computer. The computer program product includes a non-transitory computer readable medium. The non-transitory computer readable medium stores a computer program code for creating one or more statistical classifiers for recommending one or more applications and one or more computing infrastructures for executing the one or more applications. The computer program code is executable by one or more processors to extract a first set of performance parameters corresponding to the one or more applications and the one or more computing infrastructures from a historical data pertaining to the execution of the one or more applications on the one or more computing infrastructures. The computer program code is further executable by the one or more processors to select a set of application-specific parameters corresponding to the one or more applications and a set of infrastructure-specific parameters corresponding to the one or more computing infrastructures, from the first set of performance parameters, based on one or more statistical techniques. The computer program code is further executable by the one or more processors to determine a similarity between each pair of applications from the one or more applications based on the set of application-specific parameters, a similarity between each pair of computing infrastructures from the one or more computing infrastructures based on the set of infrastructure-specific parameters, and a similarity between each combination of an application from the one or more applications and a computing infrastructure from the one or more computing infrastructures, based on the set of application-specific parameters and the set of infrastructure-specific parameters. The computer program code is further executable by the one or more processors to create the one or more statistical classifiers, based on the determined similarity.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
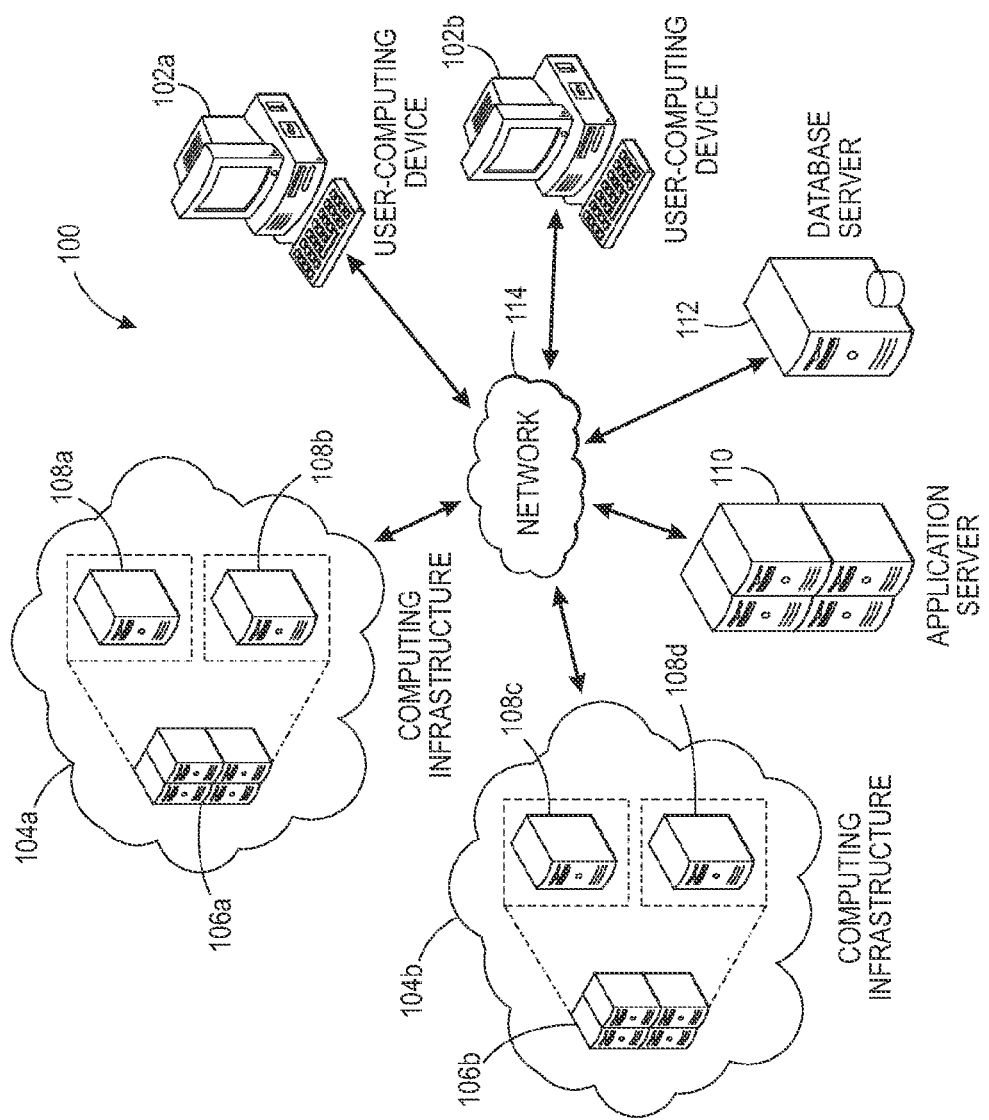
FIG. 1 is a block diagram illustrating a system environment in which various embodiments may be implemented.

The present disclosure is best understood with reference to the detailed figures and descriptions set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

A "computing device" refers to a device that includes a processor/microcontroller and/or any other electronic component, or a device or a system that performs one or more operations according to one or more programming instructions. Examples of the computing device may include, but are not limited to, a server, a desktop computer, a laptop, a personal digital assistant (PDA), a mobile phone, a smartphone, a tablet computer, and the like.

A "virtual machine (VM)" refers to a software that emulates a physical computing environment on a computing device upon which an operating system (OS) or a program can be installed and executed. The VMs are installed on a virtualization layer such as a virtualization platform or a hypervisor that manages the VM and handles the communication between the VM and the underlying physical hardware of the computing device. In an embodiment, multiple VMs may be implemented on the virtualization layer. A cloud service provider may recommend the computational resources to customers in the form of the VMs. For example, 1 GB RAM, 2 CPUs, and a disk space of 20 GB may constitute one VM.

A "computing infrastructure" refers to a universal collection of the one or more computing devices. Users may be allocated computational resources from the computing infrastructure for executing one or more applications/workloads. Examples of the computing infrastructure may include, but are not limited to, Rackspace®, Amazon Web Services (AWS), Windows Azure®, and the like. With reference to ongoing disclosure, the terms "computing infrastructure", "infrastructure", "cloud network", or "datacenter" may be used interchangeably.

"Computational resources" refer to resources associated with the computing infrastructure, required to execute an application/workload. The computational resources may correspond to, but are not limited to, processor instances, storage space, RAM space, software applications, security services, and database services. In an embodiment, the computational resources may be allocated to a user in the form of one or more VMs, for the execution of applications.

An "application" refers to software/application/workload that the customers want to execute on the computing infrastructure. The customers may use the allocated computational resources associated with the computing infrastructure to execute the one or more applications. Examples of the one or more applications may include, but are not limited to, web-based applications, big-data applications, etc.

A "historical data" refers to at least an execution data that includes information pertaining to performance parameters (e.g., throughput, execution time), when the one or more applications are executed on the one or more computing infrastructures. Further, the execution data may include types of the one or more applications and types of the one or more computing infrastructures, on which the one or more applications are executed.

A "first set of performance parameters" refers to a set of parameters pertaining to performance of execution of the one or more applications on the one or more computing infrastructures. In an embodiment, the first set of performance parameters is extracted from the historical data. In an embodiment, the first set of performance parameters includes a set of application-specific parameters and a set of infrastructure-specific parameters. In an embodiment, the parameters, such as throughput, input size, virtual memory size, heap usage, or number of failed tasks may constitute the set of application-specific parameters. In an embodiment, the parameters, such as number of servers, number of CPUs, memory, disk-space may constitute the set of infrastructure-specific parameters.

A "statistical classifier" refers to a statistical model that classifies at least one of the application, the computing infrastructure, or the application-computing infrastructure pair. In an embodiment, the statistical classifier may be created from the analysis of the set of application-specific parameters and the set of infrastructure-specific parameters obtained from the historical data.

FIG. 1 is a block diagram illustrating a system environment 100 in which various embodiments can be implemented. The system environment 100 includes one or more user-computing devices 102a and 102b (hereinafter, collectively referred to as user-computing devices 102), one or more computing infrastructures 104a and 104b (hereinafter collectively referred to as computing infrastructures 104), an application server 110, a database server 112, and a network 114. The computing infrastructure 104a includes a virtual machine server 106a that hosts virtual machines 108a-b. The computing infrastructure 104b includes a virtual machine server 106b that hosts virtual machines 108c-d. Virtual machine servers 106a and 106b are collectively referred to as virtual machine servers 106. Virtual machines 108a-d are collectively referred to as virtual machines 108. In an embodiment, the various devices of the system environment 100 (e.g., the user-computing devices 102, the virtual machine servers 106, the application server 110, and the database server 112) may be interconnected over the network 114.

The user-computing devices 102 refer to computing devices used by the users, who want to execute the one or more applications. In an embodiment, the user-computing devices 102 may request one or more computational resources to execute the one or more applications. The request may be transmitted to the computing infrastructures 104. In an embodiment, using the user-computing devices 102 (e.g., the user-computing device 102a), a user may access the one or more computational resources (in form of the virtual machines 108) using a web interface or a client application provided by the computing infrastructures 104. Further, the user-computing devices 102 may transmit the one or more applications, through the web interface or the client application to the computing infrastructures 104 for processing. The user-computing devices 102 may include a variety of computing devices, such as a desktop, a laptop, a personal digital assistant (PDA), a tablet computer, and the like.

The computing infrastructures 104 may refer to an aggregation of the one or more computing devices. The computing infrastructures 104 may include the virtual machine servers 106 that may host the one or more virtual machines 108. In an embodiment, the virtual machines 108 may be used for the execution of the one or more applications transmitted by the user through the user-computing devices 102. In an embodiment, the computing infrastructures 104 may correspond to a cloud network that includes one or more datacenters.

The virtual machine servers 106 refer to computing devices that can host the virtual machines 108. In an embodiment, the virtual machine servers 106 may correspond to one or more physical servers in a datacenter of a cloud network. The virtual machine servers 106 may determine the configuration of the virtual machines 108, based on the applications transmitted by the users through the user-computing devices 102. In an embodiment, the virtual machine servers 106 include hypervisor that manages the virtual machines 108 by mapping the computational resources associated with the virtual machines 108 to the hardware resources of the virtual machine servers 106. Examples of the hypervisor may include, but are not limited to, VMware®, KVM®, Xen®, etc.

The virtual machines 108 refer to a set of virtual machines that are hosted on the virtual machine servers 106. In an embodiment, the virtual machines 108 are offered to the users (e.g., in the form of a combination of CPUs, RAM, and disk-space) for processing the applications transmitted through the user-computing devices 102.

The application server 110 corresponds to a computing device that may host an application/tool/framework for creating one or more statistical classifiers. In an embodiment, the application server 110 may analyze the performance of the computing infrastructures 104 to generate the historical data. In an embodiment, the historical data may include at least the type of applications executed by the computing infrastructures 104, and the performance parameters associated with execution of the one or more applications. In an embodiment, the performance parameters are included in the historical data as the first set of performance parameters. Further, the application server 110 may reduce the first set of performance parameters to obtain a set of application-specific parameters and a set of infrastructure-specific parameters. The application server 110 may create the one or more statistical classifiers by using the set of application-specific parameters and the set of infrastructure-specific parameters. The one or more statistical classifiers may be utilized for at least one of recommending the computing infrastructures 104 for an application, recommending an application for the computing infrastructures 104, recommending an application-computing infrastructure pair, or predicting the performance of the one or more applications on the computing infrastructures 104. The creation of the statistical classifiers has been further explained in conjunction with FIG. 3, FIG. 4, and FIG. 5. The application server 110 may be realized through various types of servers such as, but not limited to, Java server, .NET framework, and Base4 server.

In an embodiment, a user wants to execute an application and wants recommendation of the computing infrastructures 104. In such a scenario, the user may access the application server 110 (e.g., through the client application or the web-interface) for requesting the recommendation of a computing infrastructure. Thereafter, the application server 110 may utilize one or more statistical classifiers to recommend a computing infrastructure (e.g., computing infrastructure 104a) for the execution of the application. In an alternate scenario, a computing infrastructure owner may access the application server 110 to seek recommendation of one or more applications that should be executed on the computing infrastructure (e.g., the computing infrastructure 104a). In an alternate embodiment, the user accesses the application server 110 to seek recommendation of the application-computing infrastructure pair. In an alternate scenario, a user may access the application server 110 for comparing a prediction of the performance of the one or more applications on computing infrastructures 104.

The database server 112 corresponds to a computing device that is used for storing the historical data collected by the application server 110. In an embodiment, as the one or more applications are executed on the computing infrastructures 104 and as the historical data is collected by the application server 110, the historical data may be updated in the database server 112 for later retrieval. The database server 112 may receive a query from the application server 110 to retrieve at least one of the historical data, the first set of performance parameters, the set of application-specific parameters, or the set of infrastructure-specific parameters. For querying the database server 112, one or more querying languages may be utilized such as, but not limited to, SQL, QUEL, DMX, and so forth. Further, the database server 112 may be realized through various technologies, such as, but not limited to, Microsoft® SQL server, Oracle®, and My SQL®. In an embodiment, the application server 110 may be connected to the database server 112 using one or more protocols such as, but not limited to, ODBC protocol and JDBC protocol.

The network 114 corresponds to a medium through which content and messages/signals flow between various devices of the system environment 100 (i.e., the user-computing devices 102, the virtual machine servers 106, the application server 110, and the database server 112). Examples of the network 114 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the network 114 in accordance with various wired and wireless communication protocols such as Transmission Control Protocol and Internet Protocol (TCP/IP), User Datagram Protocol (UDP), and 2G, 3G, or 4G communication protocols.

It will be apparent to a person having ordinary skill in the art that the functionalities of the database server 112 may be integrated with the application server 110, without departing from the scope of the disclosure. Further, the functionalities of the application server 110 may be integrated in the computing infrastructures 104 (e.g., in the virtual machine servers 106).

Figure 2:
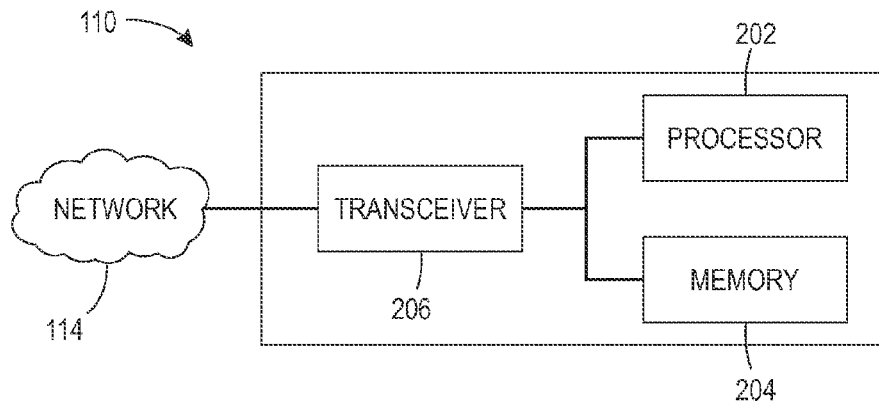
FIG. 2 is a block diagram illustrating an application server for creating one or more statistical classifiers in accordance with at least one embodiment.

FIG. 2 is a block diagram illustrating the application server 110, in accordance with at least one embodiment. The application server 110 includes a processor 202, a memory 204, and a transceiver 206.

The processor 202 is coupled to the memory 204 and the transceiver 206. The processor 202 includes suitable logic, circuitry, and/or interfaces that are operable to execute one or more instructions stored in the memory 204 to perform predetermined operations. The memory 204 may be operable to store the one or more instructions. The processor 202 may be implemented using one or more processor technologies known in the art. Examples of the processor 202 include, but are not limited to, an X86 processor, a RISC processor, an ASIC processor, a CISC processor, or any other processor.

The memory 204 stores a set of instructions and data. Some of the commonly known memory implementations include, but are not limited to, a random access memory (RAM), a read only memory (ROM), a hard disk drive (HDD), and a secure digital (SD) card. Further, the memory 204 includes the one or more instructions that are executable by the processor 202 to perform specific operations. It would be apparent to a person having ordinary skill in the art that the one or more instructions stored in the memory 204 enables the hardware of the application server 110 to perform the predetermined operation.

The transceiver 206 transmits and receives messages and data to/from various components of the system environment 100. Examples of the transceiver 206 may include, but are not limited to, an antenna, an Ethernet port, a USB port or any other port that can be configured to receive and transmit data. The transceiver 206 transmits and receives data/messages in accordance with the various communication protocols, such as, TCP/IP, UDP, and 2G, 3G, or 4G communication protocols. Operation of the application server 110 has been described in conjunction with FIG. 3.

Figure 3:
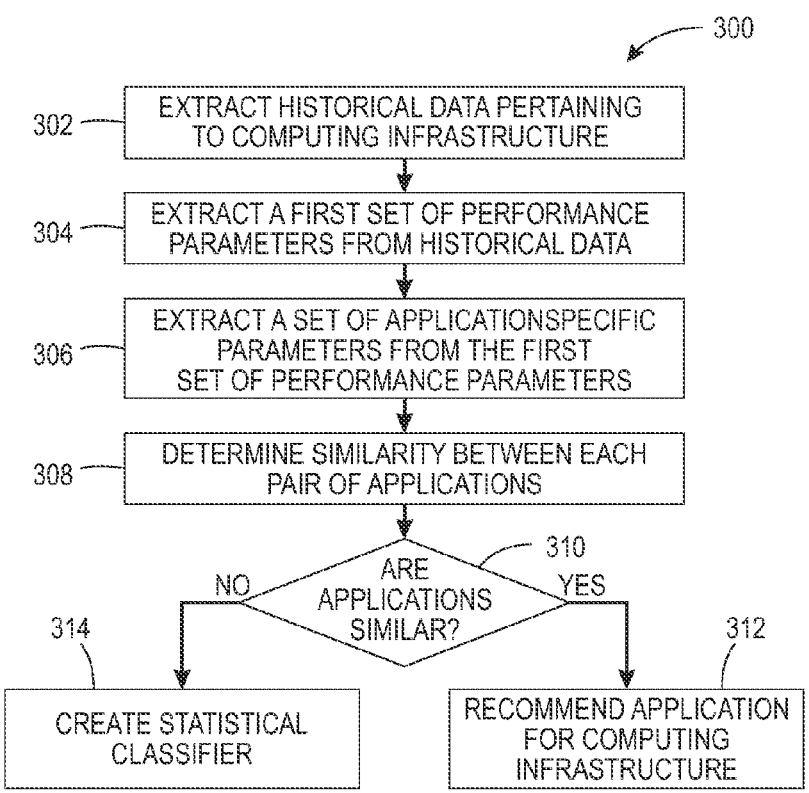
FIG. 3 is a flowchart illustrating a method for creating one or more statistical classifiers utilizable for application classification, in accordance with at least one embodiment.

FIG. 3 is a flowchart 300 illustrating a method for creating the one or more statistical classifiers utilizable for application classification, in accordance with at least one embodiment. In an embodiment, the method for creating the one or more statistical classifiers is implemented on the application server 110. The flowchart 300 is described in conjunction with FIG. 1 and FIG. 2.

In an embodiment, the application server 110 receives a request from a computing infrastructure owner to provide the recommendations of the one or more applications for the computing infrastructure (e.g., the computing infrastructure 104a). In an embodiment, the computing infrastructure owner may require the recommendation of the one or more applications for optimizing the usage of the computational resources associated with the computing infrastructure 104a. Further, in an embodiment, the computing infrastructure owner has various options of the one or more applications that are transmitted by the users through the user-computing devices 102.

At step 302, the historical data is extracted. The processor 202 may extract the historical data from the database server 112. Prior to extracting the historical data, the processor 202 monitors the execution of the one or more applications on the computing infrastructure 104a, from which the request is received. The processor 202 may determine the performance data (e.g., the first set of performance parameters) of the execution of the one or more applications from the historical data. Additionally, the historical data includes the information pertaining to the types of applications that were executed by the computing infrastructure 104a. Table 1 illustrates the historical data, when two sample applications (Word-Count and Tera-Sort) are executed on a computing infrastructure (Rackspace):

TABLE 1

Illustration of historical data for application characterization

| Application | Computing Infrastructure 104a | Throughput | Execution Time (seconds) | Input Data Size (MB) | Number of CPUs | Memory | Disk-Space |
|---|---|---|---|---|---|---|---|
| Word-Count | Rackspace | 4.23 | 56 | 650 | 2 | 2 GB | 40 GB |
| Tera-Sort | Rackspace | 6.13 | 86 | 400 | 2 | 2 GB | 40 GB |

As depicted in Table 1, the historical data includes various parameters (e.g., application-specific and infrastructure-specific) corresponding to the execution of the applications of the computing infrastructure 104a. It will be understood by a person skilled in the art that similar data may be extracted by the processor 202 for computing infrastructure 104b, when the request for the recommendations of the one or more applications is received from the computing infrastructure 104b. Further, it will be understood by a person having ordinary skill in the art that Table 1 has been provided just for illustration purposes and other parameters may be included in the historical data. For example, various types of the application-specific parameters may include, but are not limited to, throughput, execution time, input size, virtual memory size, heap usage, number of failed tasks, and the like. The infrastructure-specific parameters may include, but are not limited to, number of servers, number of CPUs, memory, or disk space.

At step 304, the first set of performance parameters is extracted. The processor 202 may extract the first set of performance parameters from the historical data. In an embodiment, the processor 202 may utilize the data processing techniques, known in the art, to extract various parameters included in the historical data. In an embodiment, the first set of performance parameters includes only the performance related information.

At step 306, the set of application-specific parameters is extracted. In an embodiment, the processor 202 extracts the set of application-specific parameters from the parameters included in the first set of performance parameters. In an embodiment, the processor 202 extracts the set of application-specific parameters using the statistical techniques, such as, but not limited to, Bayesian Information Criteria (BIC), Akaike Information Criteria (AIC), Deviance Information Criteria (DIC) or Gibb's Sampling Algorithm.

At step 308, the similarity between the one or more applications is determined. In an embodiment, the processor 202 determines the similarity between each of the one or more applications, for which the historical data is available in the database server 112. The processor 202 utilizes the set of application-specific parameters, as determined in the step 306, to determine the similarity between the two applications. For example, referring to Table 1, the processor 202 may utilize the set of application-specific parameters (i.e., the throughput, the execution time, and the input data size) to determine the similarity between the two applications (i.e., Word-Count and Tera-Sort). A person having ordinary skill in the art would understand that the one or more applications correspond to the applications that were previously executed by the computing infrastructure 104a. In an embodiment, if the historical data for the one or more applications is not available in the database server 112, then the processor 202 may generate the historical data by executing the one or more applications on a test infrastructure (not shown). In another embodiment, the historical data may be generated by executing the one or more applications on the computing infrastructure 104a, for which the recommendation is required. For example, the computing infrastructure owner wants recommendation from two applications (e.g., first application and second application) for the computing infrastructure 104a, and historical data for these two applications is not available in the database server 112. In such a scenario, the processor 202 may monitor the execution of the two applications (i.e., the first application and the second application) on the computing infrastructure 104a to generate the historical data.

In an embodiment, the similarity between the two applications may be determined using Wilcox signed-rank test that is known in the art. In the Wilcox signed-rank test, for determining the similarity between any two applications (e.g., Word-Count and Tera-Sort), it is determined whether different values of the application-specific parameters for the two applications come from the same population. In an embodiment, t-test may be used to determine that the difference between the population means in two samples of the application-specific parameters is equal. In an alternate embodiment, rank-sum test may be used as a substitute of the t-test, if the sample values are distributed non-normally.

In an embodiment, to perform the rank-sum test the combined sample data from the sets of the application-specific parameters is ranked. For example, two sets of application-specific parameters may be obtained from the two applications. Thereafter, the sum of the ranks for each of the set (e.g., $T_1$ and $T_2$, for the first set of application-specific parameters and the second set of application-specific parameters, respectively) is determined. In such a scenario, if the sample size for the two sets of the data is equal, then the rank sum statistic is the minimum of $T_1$ and $T_2$. However, if the sample size for the two sets of the data is unequal, then the smaller value of $T_1$ and $T_2$ is determined (e.g., $T_1$), and other value (i.e., $T_2$) is determined as $T_2 = n_1(n_1+n_2+1) - T_1$, where, $n_1$ and $n_2$ are the sizes of the two set of the sample data.

Further, in such a scenario (when the sample sizes for the two sets of the data is unequal), the rank sum statistic is the minimum of $T_1$ and $T_2$ At step 310, it is determined whether the two applications are similar. In case, if it is determined that the two applications are similar, step 312 is performed, else step 314 is performed.

At step 312, an application may be recommended for the computing infrastructure 104a, based on the similarity between the two applications. For example, the processor 202 determines that the two applications (refer to Table 1) are similar. In such a scenario, the processor 202 determines that any application (i.e., Word-Count and Tera-Sort) may be recommended for the computing infrastructure 104a, since performance of both the applications is similar on the computing infrastructure 104a.

At step 314, a statistical classifier is created. If at the step 310, it is determined that the two applications (e.g., Word-Count and Tera-Sort) are not similar, then the performance of one application cannot be determined based on the other application, and thus, in such a scenario, a statistical classifier is created for the two applications. The processor 202 may utilize the set of application-specific parameters, as determined in the step 306, to create the statistical classifier. In an embodiment, the statistical classifier is created using a method: binomial GLM with probit link. In such a scenario, binomial GLM may be described by following set of equations:

$$\mu_i = E(Y_i) \tag{1}$$

$$\eta_i = \alpha + \Sigma_{j=1}^{k} \beta_j x_{ij} \tag{2}$$

where,
Y=response variable,
$x_1, x_2, \ldots, x_n$=predictor variables,
$\eta_i$=Link function that is linear in the regression coefficients.

In an embodiment, g (.) denotes a link function such that $g(\mu_i) = \eta_i$. In such a scenario, for a binomial GLM with probit link, $Y_i$ conditional on $x_{i1}, x_{i2}, \ldots, x_{ik}$ follows a binomial distribution, and $g(\mu_i)=\phi^{-1}(\mu_i)$, where, $\phi$ is the cumulative normal distribution, $$\text{i.e., } \phi(x) = \frac{1}{\sqrt{2\pi}} \int_{-\infty}^{x} e^{-\frac{u^2}{2}} du.$$

In an alternate embodiment, the statistical classifier may be created based on a Support Vector Machine (SVM) method, known in the art, for different types of the applications.

In an embodiment, the created statistical classifier may be utilized for classifying a new application that is transmitted by the users. For example, a user transmits an application using the user-computing device 102a. In an embodiment, the performance data (i.e., the first set of performance parameters) is provided by the user. In an alternate embodiment, the first set of performance parameters are extracted by executing the application on the computing infrastructure 104a. In an alternate embodiment, the first set of performance parameters is extracted by executing the application on a test infrastructure (not shown). Subsequently, the processor 202 may utilize the first set of performance parameters to obtain the set of application-specific parameters. The processor 202 may further utilize the set of application-specific parameters to classify the application in one of the one or more applications, whose performance parameters are available in the database server 112. Based on the classification, the computing infrastructures 104 may be recommended the application. For example, the user transmits a new big-data application along with the first set of performance parameters. If the statistical classifier classifies the big-data application as Word-Count application, then the computing infrastructure 104a may be recommended big-data application, based on the performance data available for the Word-Count application.

In an embodiment, the degree to which the statistical classifiers fit with the real time observations of the output data (when the applications are executed on the computing infrastructures 104) may be checked by determining the number of correct classifications done by the statistical classifier. In an embodiment, the statistical classifier determines an accuracy index for this purpose. For example, there are n observations when an application is executed on a computing infrastructure. If the statistical classifier correctly predicts p observations to their true class (i.e., to which application type the data belongs to), then the accuracy index for the statistical classifier would be p/n. As an example, two types of the applications (e.g., the Word-Count and Tera-Sort) are executed on the computing infrastructures 104. If the number of observations falling to Word-Count and Tera-Sort are 48 and 56, respectively, and the statistical classifier correctly predicted 24 and 40 observations for the Word-Count and the Tera-Sort, respectively, then the accuracy index of the statistical classifier will be:

$$\frac{(24+40)}{(48+56)} = 0.63$$

In an alternate embodiment, the goodness of the statistical classifier may also be verified through a classification table. In such a scenario, if there are k applications, then the classification table can be represented in the form a k*k matrix, such that (i, j)$^{th}$ entry corresponds to number of observations actually coming from the i$^{th}$ application, but predicted to be in j$^{th}$ application by the statistical classifier. Thus, in such a scenario, the diagonal entries represent the number of entries correctly classified by the statistical classifier, whereas the off-diagonal entries correspond to incorrectly classified entries. The illustration of the classification table for two applications (i.e., Word-Count and Tera-Sort) is provided in following classification table:

TABLE 2

Illustration of the classification table corresponding to the two applications (Word-Count and Tera-Sort)

|  | Word-Count | Tera-Sort |
| --- | --- | --- |
| Word-Count | 24 | 24 |
| Tera-Sort | 16 | 40 |

It can be observed from the Table 2 that there are 24 observations that actually belong to the Word-Count application and the statistical classifier correctly identified the same. In a similar way, there are 40 observations that the statistical classifier correctly classified to be in Tera-Sort application. Thus, total number of correct observations by the statistical classifier is 64 (i.e., the sum of the diagonal entries). Further, it can be observed that the total number of the observations in the classification table is 104. Thus, the accuracy index for the classification table (Table 2) may be determined as:

$$\frac{64}{104} = 0.63$$

It will be apparent to a person skilled in the art that similar classification tables can be created for each type of statistical classifier (i.e., created through GLM method or through SVM method).

Figure 4:
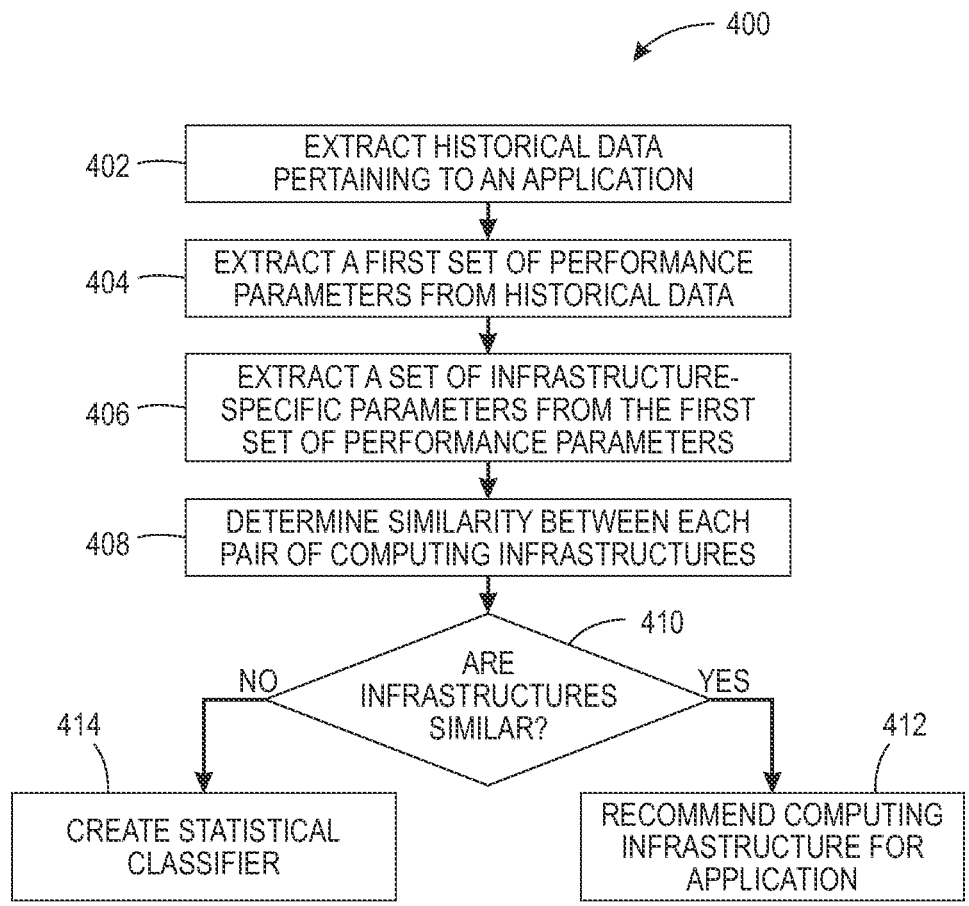
FIG. 4 is a flowchart illustrating a method for creating the one or more statistical classifiers utilizable for computing infrastructure recommendation, in accordance with at least one embodiment.

FIG. 4 is a flowchart 400 illustrating a method for creating the one or more statistical classifiers utilizable for computing infrastructure recommendation, in accordance with at least one embodiment. In an embodiment, the method for creating the one or more statistical classifiers is implemented on the application server 110. The flowchart 400 is described in conjunction with FIG. 1, FIG. 2, and FIG. 3.

In an embodiment, the application server 110 receives a request from the user-computing device 102a to recommend a computing infrastructure for an application (e.g., Word-Count). In an embodiment, the user may require the recommendation so that the application may be executed with optimized performance.

At step 402, the historical data is extracted. The processor 202 extracts the historical data from the database server 112. Prior to extracting the historical data, the processor 202 monitors the execution of the application on the computing infrastructures 104. Further details about the analysis of the historical data have already been discussed in conjunction with the step 302. Table 3 illustrates the historical data, when the application (e.g., Word-Count) transmitted by the user is executed on two computing infrastructures (i.e., the Rackspace and AWS):

TABLE 3

Illustration of historical data for computing infrastructure recommendation

| Computing Infrastructure | Application | Throughput | Execution Time (seconds) | Input Data Size (MB) | Number of CPUs | Memory | Disk-Space |
|---|---|---|---|---|---|---|---|
| Rackspace | Word-Count | 5.32 | 48 | 570 | 1 | 1 GB | 40 GB |
| AWS | Word-Count | 4.63 | 78 | 350 | 2 | 2 GB | 60 GB |

At step 404, the first set of performance parameters is extracted from the historical data, as discussed in conjunction with the step 304.

At step 406, the set of infrastructure-specific parameters is extracted from the first set of performance parameters. In an embodiment, the processor 202 extracts the set of infrastructure-specific parameters from the parameters included in the first set of performance parameters. In an embodiment, the processor 202 extracts the set of infrastructure-specific parameters using the statistical techniques, such as, but not limited to, Bayesian Information Criteria (BIC), Akaike Information Criteria (AIC), Deviance Information Criteria (DIC) or Gibb's Sampling Algorithm.

In an embodiment, the performance data for the application may be provided by the user, as discussed above. In such a scenario, the processor 202 may utilize the performance data to extract the set of infrastructure-specific parameters.

At step 408, the similarity between the computing infrastructures 104 is determined. In an embodiment, the processor 202 determines the similarity between each pair of the computing infrastructures, for which the historical data is available in the database server 112. The processor 202 utilizes the set of infrastructure-specific parameters, as determined in the step 406, to determine the similarity between the two computing infrastructures. For example, referring to Table 3, the processor 202 may utilize the set of infrastructures-specific parameters (i.e., the number of CPUs, RAM, disk-space) to determine the similarity between the computing infrastructures (i.e., Rackspace and AWS). In an embodiment, the similarity between the two computing infrastructures may be determined using Wilcox signed-rank test, as disclosed in conjunction with FIG. 3.

At step 410, it is determined whether the two computing infrastructures (i.e., Rackspace and AWS) are similar. In case, it is determined that the two computing infrastructures are similar, step 412 is performed, else step 414 is performed.

At step 412, a computing infrastructure may be recommended for the application (i.e., Word-Count), based on the similarity between the two computing infrastructures. For example, the processor 202 determines that the two computing infrastructures (i.e., Rackspace and AWS) are similar. In such a scenario, the processor 202 determines that any of the two computing infrastructures may be recommended for the application Word-Count, since performance of the application is similar on both the computing infrastructures.

At step 414, a statistical classifier is created. If at the step 410, it is determined that the two computing infrastructures (i.e., Rackspace and AWS) are not similar, then the processor 202 creates the statistical classifier for the two computing infrastructures. The processor 202 may utilize the determined set of infrastructures-specific parameters, as determined in the step 406, to create the statistical classifier. In an embodiment, the statistical classifier is created using a method: binomial GLM with probit link, as disclosed in conjunction with FIG. 3. Further, as discussed, the statistical classifier may also be created using SVM method, without departing from the scope of the invention.

In an embodiment, the created statistical classifier may be utilized for recommending a computing infrastructure for the application. For example, if the two computing infrastructures (Rackspace and AWS) are found to be dissimilar, then the classifier may recommend the computing infrastructures (out of Rackspace and AWS) for the application.

In an embodiment, the degree to which the statistical classifier fit with the real time observations of the output data (when the applications are executed on the computing infrastructures) may be checked by determining the number of correct classifications done by the statistical classifier, as disclosed in conjunction with FIG. 3. Further, as discussed, an accuracy index may be determined for checking the degree of the fit of the statistical classifier. Alternatively, a classification table may also be created corresponding to different computing infrastructures to determine the goodness of the statistical classifier. Table 4 provided below illustrates a classification table for two computing infrastructures (i.e., the Rackspace and AWS):

TABLE 4

Illustration of the classification table corresponding to the two computing infrastructures (Rackspace and AWS)

|  | Rackspace | AWS |
|---|---|---|
| Rackspace | 34 | 14 |
| AWS | 16 | 40 |

As discussed in conjunction with FIG. 3, the sum of the diagonal entries in the classification tables depicts the number of observations correctly classified by the statistical classifier, and off-diagonal entries depict number of observations incorrectly classified by the statistical classifier. Thus, the accuracy index for the classification table (Table 3) may be determined as:

$$\frac{74}{104} = 0.71$$

Figure 5:
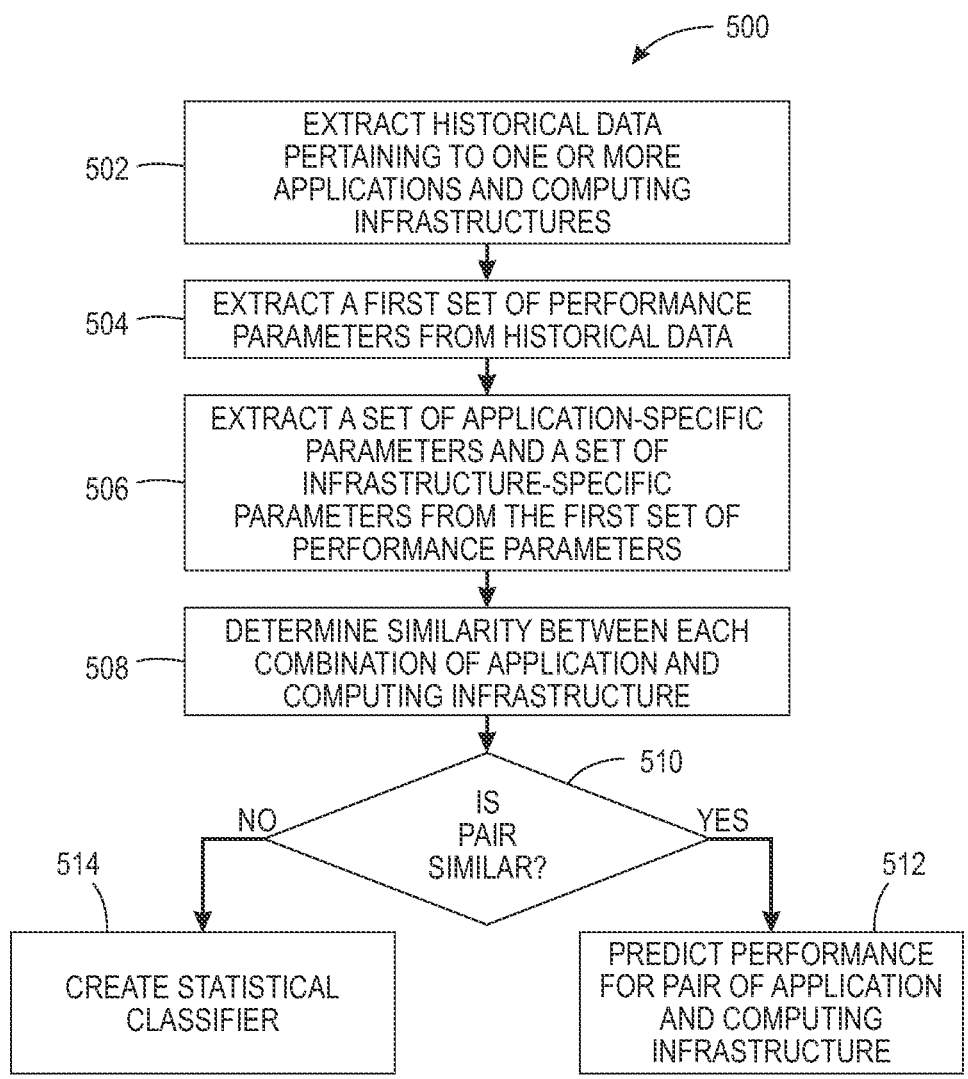
FIG. 5 is a flowchart illustrating a method for creating the one or more statistical classifiers utilizable for recommending an application-computing infrastructure pair, in accordance with at least one embodiment.

FIG. 5 is flowchart 500 illustrating a method for creating the one or more statistical classifiers to be utilized for recommending an application-computing infrastructure pair, in accordance with at least one embodiment. In an embodiment, the method for creating the one or more statistical classifiers is implemented on the application server 110. The flowchart 500 is described in conjunction with FIG. 1, FIG. 2, FIG. 3, and FIG. 4.

In an embodiment, the application server 110 receives a request from the user-computing device 102a for recommending an application-computing infrastructure pair.

At step 502, the historical data is extracted. The processor 202 extracts the historical data from the database server 112. Prior to extracting the historical data, the processor 202 monitors the execution of the one or more applications on the computing infrastructures 104. Table 5 illustrates the historical data, when two applications (e.g., Word-Count and Tera-Sort) transmitted by the users are executed on two computing infrastructures (e.g., Rackspace and AWS):

TABLE 5

Illustration of the historical data for application-computing infrastructure pair recommendation

| Application | Computing Infrastructure | Throughput | Execution Time (seconds) | Input Data Size (MB) | Number of CPUs | Memory | Disk-Space |
|---|---|---|---|---|---|---|---|
| Word-Count | Rackspace | 3.76 | 48 | 550 | 2 | 2 GB | 60 GB |
|  | AWS | 4.89 | 77 | 710 | 3 | 4 GB | 80 GB |
| Tera-Sort | Rackspace | 5.96 | 81 | 310 | 1 | 1 GB | 40 GB |
|  | AWS | 5.25 | 56 | 390 | 2 | 2 GB | 40 GB |

At step 504, the first set of performance parameters is extracted from the historical data, as described in conjunction with FIG. 3 and FIG. 4.

At step 506, the set of application-specific parameters and the set of infrastructure-specific parameters are extracted, as described in conjunction with FIG. 3 and FIG. 4.

At step 508, the similarity between each pair of an application and a computing infrastructure is determined. In an embodiment, the processor 202 utilizes the set of application-specific parameters and the set of infrastructure-specific parameters, as determined in the step 506, to determine the similarity between the pair of the application and the computing infrastructure. For example, if two applications (Word-Count and Tera-Sort) are executed on two computing infrastructures (Rackspace and AWS), then the processor 202 may determine the similarity for all the four possible combinations of the application-computing infrastructure pair (i.e., Word-Count and Rackspace, Word-Count and AWS, Tera-Sort and Rackspace, and Tera-Sort and AWS). In an embodiment, the similarity between such pair of the applications and the computing infrastructures may be determined using Wilcox signed-rank test, as disclosed in conjunction with FIG. 3.

At step 510, it is determined whether the two pairs of the application-computing infrastructure combinations are similar. In case, it is determined that the two pairs are similar, step 512 is performed, else step 514 is performed.

At step 512, for any known set of performance parameters, an application may be recommended for a computing infrastructure, based on the similarity between the two pairs of the application-computing infrastructure combinations determined in the step 510. For example, at the step 510, it is determined that the pair of Word-Count and Rackspace, and Tera-Sort and AWS are similar. In such a scenario, if a user accesses the application server 110 to seek recommendation of an application-computing infrastructure pair, and the parameters values for the combination of the Word-Count and Rackspace are known, then the user may be recommended the combination Tera-Sort and the computing infrastructure AWS, based on the similarity between the two pairs.

At step 514, a statistical classifier is created. If at the step 504, it is determined that the two pairs of the application-computing infrastructure are not similar, then the processor 202 creates the statistical classifier for the two pairs. The processor 202 may utilize the determined set of application-specific parameters and the set of infrastructures-specific parameters, as determined in the step 506, to create the statistical classifier. In an embodiment, the statistical classifier is created using a method: binomial GLM with probit link, as disclosed in conjunction with FIG. 3. Further, as discussed, the statistical classifier may also be created using SVM method, without departing from the scope of the invention.

In an embodiment, the degree to which the statistical classifier fit with the real time observations of the output data (when the applications are executed on the computing infrastructures) may be checked by determining the number of correct classifications done by the statistical classifier, as disclosed in conjunction with FIG. 3. Further, as discussed, an accuracy index may be determined for checking the degree of the fit of the statistical classifier. Alternatively, a classification table may also be created corresponding to different pairs of the applications and the computing infrastructures to determine the goodness of the statistical classifier. Table 6 illustrates a classification table for 4 combinations (as disclosed above) when two applications (i.e., Word-Count and Tera-Sort) are executed on two computing infrastructures (i.e., Rackspace and AWS):

TABLE 6

Illustration of the classification table corresponding to the four pairs

|  | Word-Count and Rackspace | Word-Count and AWS | Tera-Sort and Rackspace | Tera-Sort and AWS |
|---|---|---|---|---|
| Word-Count and Rackspace | 21 | 0 | 7 | 0 |
| Word-Count and AWS | 0 | 0 | 8 | 12 |
| Tera-Sort and Rackspace | 1 | 0 | 15 | 12 |
| Tera-Sort and AWS | 0 | 0 | 0 | 28 |

As discussed in conjunction with FIG. 3, sum of the diagonal entries in the classification tables depicts the number of observations correctly classified by the statistical classifier, and off-diagonal entries depict number of observations incorrectly classified by the statistical classifier. Thus, the accuracy index for the classification table (Table 4) may be determined as:

$$\frac{64}{104} = 0.62$$

Figure 6:
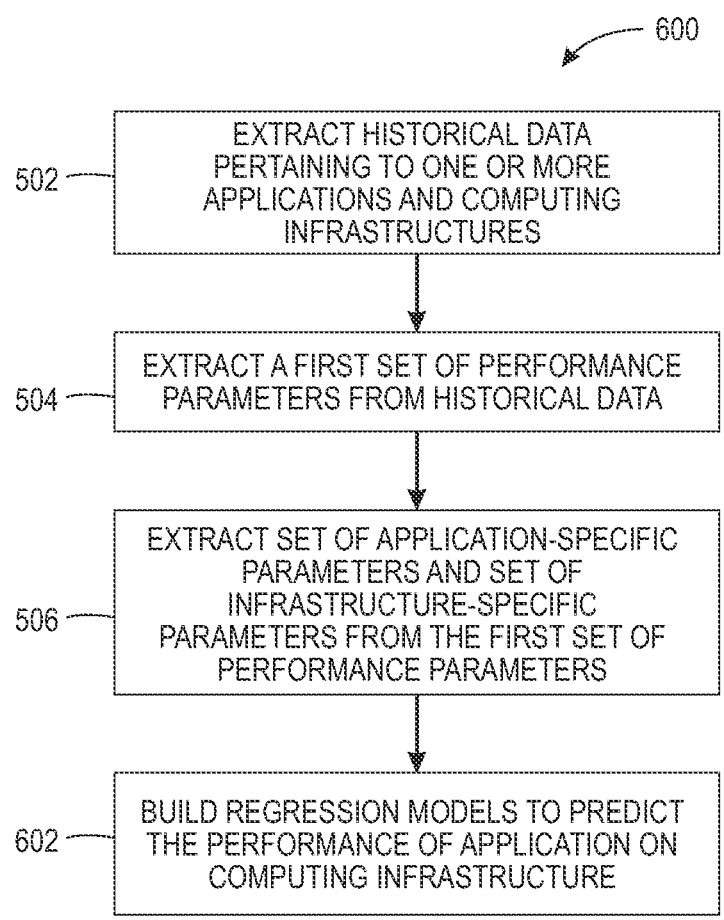
FIG. 6 is a flowchart illustrating a method for predicting the performance of an application on a computing infrastructure, in accordance with at least one embodiment.

FIG. 6 is a flow chart 600 illustrating a method for predicting the performance for an application on a computing infrastructures, in accordance with at least one embodiment. In an embodiment, the method for predicting the performance is implemented on the application server 110. Further, the flow chart 600 is described in conjunction with FIG. 1, FIG. 2, and FIG. 3

Steps 502 to 506 have already been described in conjunction with FIG. 5.

At step 602, regression models are built to predict the performance of the applications on the computing infrastructures. The processor 202 may build the regression model, utilizing the set of application-specific parameters and the set of infrastructure-specific parameters, as determined in the step 306. In an embodiment, a regression model in which the throughput is the outcome and other parameters (including the applications and the computing infrastructures) are input, may correspond to a linear model of below form:

$$\text{Throughput} = \beta_0 + \beta_1 \times \text{Input size} + \beta_2 \times \text{Execution time} + \epsilon, \quad (3)$$

where, $\beta_i$ are unknown parameters, and $\epsilon$=Gaussian noise.

In such a scenario, whenever new performance parameters come, the outcome (i.e., the throughput) may be predicted using the equation (3).

Thus, it will be apparent to a person skilled in the art that a user, who wants to know the performance parameters of an application on a computing infrastructure, may access the application server 110. Subsequently, the application server 110 may utilize the equation (3) to predict the performance of the application on the computing infrastructure.

In an embodiment, the above disclosed methods and systems may be utilized by a computing infrastructure provider to recommend a configuration of the virtual machines, when a user accesses the application server 110 for such recommendation. For example, a user transmits an application to a computing infrastructure, using user-computing device 102. The user wants recommendation for the one or more virtual machines for executing the application. In such a scenario, the application server 110 may generate the historical data that corresponds to the execution of the application on the one or more virtual machines. Subsequently, the application server 110 may determine the first set of performance parameters and the set of application-specific parameters and the set of infrastructure-specific parameters, as disclosed above. The application server 110 may create the statistical classifiers, as described above, and may utilize the statistical classifiers to recommend the one or more virtual machines for the application transmitted by the user.

In an alternate embodiment, the above disclosed methods and systems may be implemented in a computing infrastructure that includes only one computing device (e.g., a computer desktop or a laptop). In such a scenario, different types of the applications may be recommended for the computing device, based on the statistical classifiers, as disclosed above. It will be apparent to a person skilled in the art that the different types of the applications correspond to a software or tool that may be executed on the computing device. Examples of the applications may include, but are not limited to, office applications (e.g., Microsoft Office®), gaming applications, programming applications, and the like. Similarly, for any application, a computing device may be recommended that optimizes the performance of the application.

The disclosed embodiments encompass numerous advantages. Predicting performance of the different applications on different computing infrastructures has been of great importance to the applications users as well as the computing infrastructures owners. For example, accurate prediction of the performance of the applications on the computing infrastructures can enable best assignment of applications to the computing infrastructures from a resource management point of view. In addition, this may also help provide proper recommendation and consultation to the users for the selection of best computing infrastructure provider. Traditionally, these types of requirements were catered by modeling specific applications for specific infrastructures. Some of the techniques also utilized benchmarking based techniques, in which application performance (e.g., in the form of throughput) is modeled with respect to input load (e.g., in the form of input data concurrent users, etc.) for different computing infrastructures. However, dependencies between the applications and the computing infrastructures can be intricate ones, and thus different applications may perform differently on different types of the computing infrastructures. In the present disclosure, by determining the similarities between different combinations of the applications and the computing infrastructures, modeling is performed in a generic manner, and thus the performance of any application can be predicted on any provided computing infrastructure. Further, as discussed, utilizing the created statistical classifiers, the application users may seek recommendation of the optimal computing infrastructure for executing their applications. In a similar way, the computing infrastructure owners may utilize the created statistical classifiers to obtain recommendation of the best applications for their computing infrastructures, thus leading to better resource management of the computing infrastructures.

In addition, determining the first set of performance parameters from the historical data and extracting the set of application-specific parameters and the set of infrastructure-specific parameters, from the first set of performance parameters make the analysis of the historical data more accurate and relevant.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet.

The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for creating one or more statistical classifiers have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for creating one or more statistical classifiers for recommending one or more applications and one or more computing infrastructures for executing the one or more applications, the method comprising:

extracting, by one or more processors, a first set of performance parameters corresponding to the one or more applications and the one or more computing infrastructures from a historical data pertaining to the execution of the one or more applications on the one or more computing infrastructures;

selecting, by the one or more processors, a set of application-specific parameters corresponding to the one or more applications and a set of infrastructure-specific parameters corresponding to the one or more computing infrastructures, from the first set of performance parameters, based on one or more statistical techniques, wherein the one or more statistical techniques comprises at least one of Bayesian Information Criteria (BIC), Akaike Information Criteria (AIC), Deviance Information Criteria (DIC) or Gibb's Sampling Algorithm;

determining, by the one or more processors:
a similarity between each pair of applications from the one or more applications based on the set of application-specific parameters,
a similarity between each pair of computing infrastructures from the one or more computing infrastructures based on the set of infrastructure-specific parameters, and
a similarity between each combination of an application from the one or more applications and a computing infrastructure from the one or more computing infrastructures, based on the set of application-specific parameters and the set of infrastructure-specific parameters; and creating, by the one or more processors, the one or more statistical classifiers, based on the determined similarity.

2. The method of claim 1 further comprising predicting, by the one or more processors, performance of the one or more applications on each of the one or more computing infrastructures, based on the one or more statistical classifiers.

3. The method of claim 1, wherein the similarity between each pair of applications, the similarity between each pair of computing infrastructures, and the similarity between each pair of application and computing infrastructure, are determined based on at least one of a Wilcox-signed rank test, a t-test, or a rank sum test.

4. The method of claim 1, wherein the set of application-specific parameters comprises at least one of a throughput, an execution time, an input size, virtual memory size, heap usage, or a number of failed tasks.

5. The method of claim 1, wherein the set of infrastructure-specific parameters comprises at least one of a number of servers, a number of CPUs, memory, or disk space.

6. The method of claim 1, wherein the one or more statistical classifiers are created based on at least one of logistic regression method, a poisson GLM method, a binomial GLM method, a support vector machine (SVM) method, or a k-nearest neighbor method.

7. A system for creating one or more statistical classifiers for recommending one or more applications and one or more computing infrastructures for executing the one or more applications, the system comprising:
one or more processors operable to:
extract a first set of performance parameters corresponding to the one or more applications and the one or more computing infrastructures from a historical data pertaining to the execution of the one or more applications on the one or more computing infrastructures;
select a set of application-specific parameters corresponding to the one or more applications and a set of infrastructure-specific parameters corresponding to the one or more computing infrastructures, from the first set of performance parameters, based on one or more statistical techniques, wherein the one or more statistical techniques comprises at least one of Bayesian Information Criteria (BIC), Akaike Information Criteria (AIC), Deviance Information Criteria (DIC) or Gibb's Sampling Algorithm;
determine a similarity between each pair of applications from the one or more applications based on the set of application-specific parameters, a similarity between each pair of computing infrastructures from the one or more computing infrastructures based on the set of infrastructure-specific parameters, and a similarity between each combination of an application from the one or more applications and a computing infrastructure from the one or more computing infrastructures, based on the set of application-specific parameters and the set of infrastructure-specific parameters; and
create the one or more statistical classifiers, based on the determined similarity.

8. The system of claim 7, wherein the one or more processors are further operable to predict performance of the one or more applications on each of the one or more computing infrastructures, based on the one or more statistical classifiers.

9. The system of claim 7, wherein the similarity between each pair of applications, the similarity between each pair of computing infrastructures, and the similarity between each pair of application and computing infrastructure, are determined based on at least one of a Wilcox-signed rank test, a t-test, or a rank sum test.

10. The system of claim 7, wherein the set of application-specific parameters comprises at least one of a throughput, an execution time, an input size, virtual memory size, heap usage, or a number of failed tasks.

11. The system of claim 7, wherein the set of infrastructure-specific parameters comprises at least one of a number of servers, a number of CPUs, memory, or disk space.

12. The system of claim 7, wherein the one or more statistical classifiers are created based on at least one of logistic regression method, a poisson GLM method, a binomial GLM method, a support vector machine (SVM) method, or a k-nearest neighbor method.

13. A computer program product for use with a computer, the computer program product comprising a non-transitory computer readable medium, wherein the non-transitory computer readable medium stores a computer program code for creating one or more statistical classifiers for recommending one or more applications and one or more computing infrastructures for executing the one or more applications, wherein the computer program code is executable by one or more processors to:
extract a first set of performance parameters corresponding to the one or more applications and the one or more computing infrastructures from a historical data pertaining to the execution of the one or more applications on the one or more computing infrastructures;
select a set of application-specific parameters corresponding to the one or more applications and a set of infrastructure-specific parameters corresponding to the one or more computing infrastructures, from the first set of performance parameters, based on one or more statistical techniques, wherein the one or more statistical techniques comprises at least one of Bayesian Information Criteria (BIC), Akaike Information Criteria (AIC), Deviance Information Criteria (DIC) or Gibb's Sampling Algorithm;
determine a similarity between each pair of applications from the one or more applications based on the set of application-specific parameters, a similarity between each pair of computing infrastructures from the one or more computing infrastructures based on the set of infrastructure-specific parameters, and a similarity between each combination of an application from the one or more applications and a computing infrastructure from the one or more computing infrastructures, based on the set of application-specific parameters and the set of infrastructure-specific parameters; and
create the one or more statistical classifiers, based on the determined similarity.

* * * * *